United States Patent Office 3,128,445
Patented Apr. 7, 1964

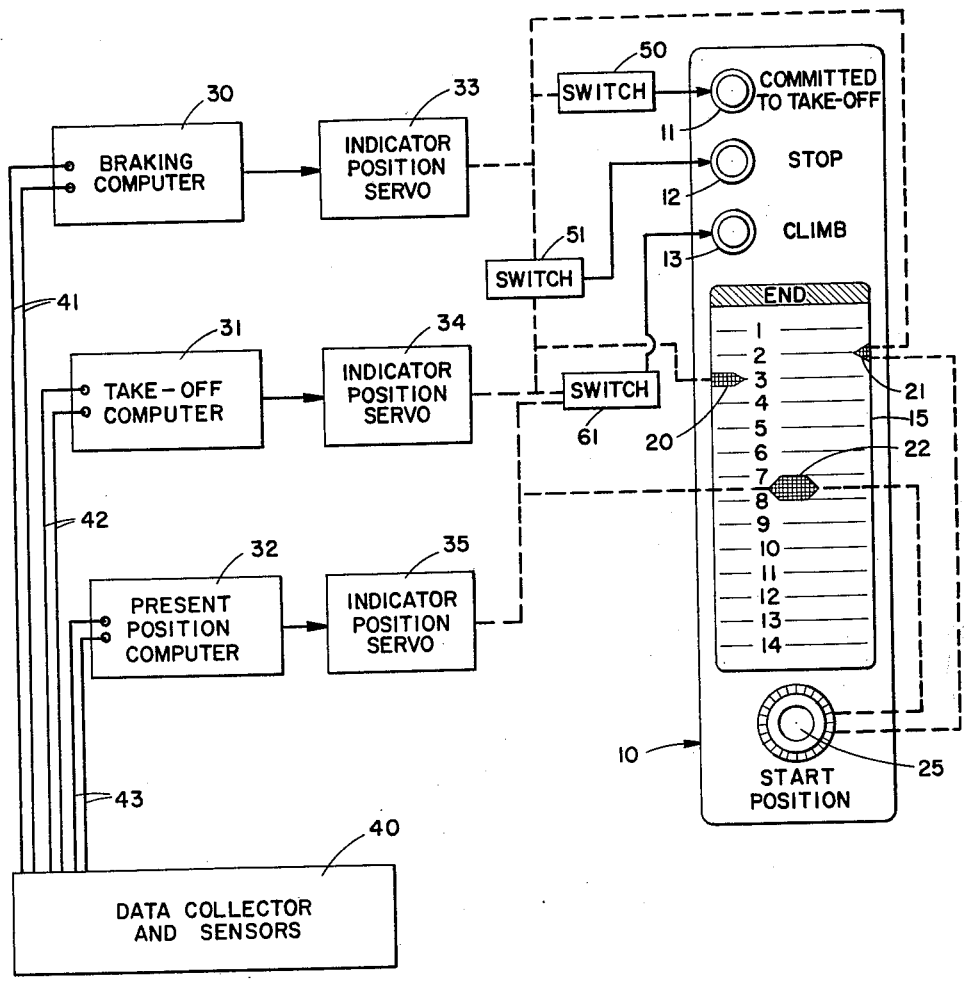

3,128,445
AIRCRAFT TAKE-OFF MONITORING
Norman F. Hosford, Davenport, Iowa, assignor to The Bendix Corporation, a corporation of Delaware
Filed Sept. 4, 1958, Ser. No. 759,012
5 Claims. (Cl. 340—27)

This invention relates to aircraft take-off monitoring and relates particularly to methods and means for continuously presenting to aircraft pilots current facts concerning the safety of his take-off attempt.

An object of the invention is to present to the pilot, the conclusion to be drawn, from the effect of his actions, about the safety of his take-off. Another object is to display the decision which the pilot should make in view of the conclusion.

Many aircraft, and especially the larger jet powered aircraft, require runways for take-off which are so long that the pilot's task of estimating whether or not the control action he is taking now will enable him to take-off is exceedingly difficult. As the pilot moves down the runway increasing his speed, he must continually judge whether in view of his present speed and rate of increase in speed he will be able to take-off from the runway. Some pilots rely entirely on intuition and judgment to determine the question while others couple judgment with calculations made before take-off of the minimum speeds at which they should pass certain points on the runway for a successful take-off.

The difficulty of predicting that the take-off will be successful within a time permitting abortion of the take-off if it cannot be successful, becomes very much greater as take-off speeds increase.

Prior attempts to aid the pilot have been confined to presenting him with such information as present speed and acceleration, deviations of these factors from theoretical values of these variables and the like. The theory, of course, is to give the pilot current facts which he can weigh in estimating whether he can take-off or must stop. However, even though he is given these facts, he must still rely only on his own judgment and intuition.

An object of this invention is to display to the pilot a continuously calculated answer to the question, "Can take-off and stopping be accomplished on the runway?", and to present the answer not as a simple negative or affirmative fact but in a way which will show the pilot the margin of safety left to him.

Another object is to display to the pilot the decision with respect to taking-off or stopping which logically follows the answer.

The invention is well suited to use of lineal indication as distinguished from rotary dial indication and the use of lineal indication is another object of the invention.

Certain of these objects are realized by a continuous display of the comparative locations, on a representation of the runway, of the positions at which the aircraft can become airborne or stopped.

Other objects and advantages of the invention will be apparent in the accompanying drawing and the description of the embodiment of the invention therein shown, it being understood that various modifications may be made in this embodiment and that other embodiments are possible without departing from the spirit of the invention or the scope of the appended claims.

In the drawing, a take-off monitor indicator, shown in a front elevational view, is included in a take-off monitor system whose computer section is illustrated schematically.

The take-off indicator 10 is arranged for vertical mounting on the front console of an aircraft. At its upper end it has three lights arranged in a veritcal line and marked "Committed to Take-Off," "Stop," and "Climb" and designated 11, 12, and 13, respectively. Below the lights is a glass window through which may be seen a scale 15 representing the runway from which the take-off attempt is to be made. The runway may be marked, as shown, with horizontal lines to indicate distance along the runway measured from its end. The runway represented on the indicator shown is provided with 15 horizontal lines representing imaginary lines on the runway, spaced 1,000 feet apart and numbered from 1 to 15.

The upper end of the runway scale is marked "End" and the entire scale is colored to contrast with the color of the three pointers, 20, 21, and 22, which move over the scale. The pointer 20 is movable along the left edge of the scale and, when the instrument is in operation, points to that distance from the end of the runway at which it is predicted that the aircraft airspeed will be equal to take-off speed in view of the actions that the pilot has already taken in proceeding down the runway toward take-off. The current position of the aircraft on the runway is indicated by the pointer 22 which moves along the vertical centerline of scale 15. The point at which the aircraft could be stopped if the brakes were to be applied is indicated by the pointer 21 which moves along the right edge of scale 15. The dial 25, below scale 15, is connected with pointer 22 to permit manual adjustment of the pointer to the plane's position on the runway prior to the attempted take-off.

Thus pointers 20, 21, and 22 move over the face of scale 15 so that at any time during attempted take-off the pilot may ascertain the position of his aircraft on the runway, the position his plane will have when take-off is possible and the point at which his airplane would come to a stop if he applied the brakes. The position of the indicators is determined by atmospheric conditions, condition of the aircraft and runway and by what the pilot has previously done during the take-off attempt to alter speed and acceleration of the aircraft. Consequently, the position of the pointers at any time indicates to the pilot answers to the questions: "Where am I on the runway; will I be able to take off from the runway; and is it possible to stop the airplane on the runway?"

The three lights at the top of the indicator are illuminated to show him the conclusions to be drawn from the situation presented by the position of the indicators and they indicate to the pilot what decision should be made with respect to taking off or stopping.

At the beginning of the take-off procedure the present position indicator 22 is set manually at the actual distance of the aircraft from the end of the runway to indicate the starting position of the aircraft. When the airplane is at rest the stop pointer 21 should be in line with the position pointer 22 and it is so set by dial 25 at the same time that the initial position indicator 22 is set. The take-off point indicator 20 initially rests at the top of the scale beyond the end of the runway. Now as the aircraft starts down the runway and gains in ground and air speed, the stop indicator 21 will move ahead of the present position indicator 22 in the direction of the end of the runway to indicate that as the plane travels faster the point at which it can be stopped moves nearer the end of the runway. As the aircraft gains speed the predicated take-off position indicator 20 moves down the scale away from the end of the runway until, when the aircraft speed reaches take-off speed, the predicted take-off position indicator will have moved to position opposite the present position indicator 22. At this time the climb light 13 will be illuminated indicating to the plot that take-off speed has been reached and that the decision should be made to manipulate the controls to make the aircraft climb and take-off.

During the take-off, as the aircraft speed is increased and the end of the runway is approached, the condition may be reached in which the stop pointer 21 moves beyond the end of the runway. When this has happened, the pilot is committed to take-off and light 11 is illuminated to indicate this fact. If during the take-off attempt the aircraft is not accelerated rapidly enough or take-off is started too close to the end of the runway, or if for any other reason the predicated point of take-off indicator 20 remains beyond the end of the runway as the predicted stopping point indicator 21 approaches the end of the runway so that it is likely that both the take-off and stopping points would be beyond the end of the runway, then the stop light 12 will be illuminated.

The position of the indicators on dial 15 may be computed in a variety of ways. Advantageously three computers are employed as shown. A braking computer 30 calculates the predicated distance from the end of the runway at which the aircraft may be stopped if braked. The take-off computer 31 calculates the currently predicted distance from the end of the runway at which aircraft speed will equal take-off speed and take-off can be accomplished. Computer 32 calculates the present position of the aircraft on the runway. The outputs of computers 30, 31, and 32 are connected to operate indicator position servo mechanisms 33, 34, and 35, respectively, which adjust the position of indicators 21, 20, and 22, respectively.

Information on the magnitude of the several variables that are required to make the computations is collected in a data collector 40 connected by pairs of leads 41, 42, and 43 to computers 30, 31, and 32, respectively, the braking computer advantageously calculates the distance between the aircraft and the end of the runway, less the distance in which the aircraft can be stopped in view of the friction coefficient of the runway, the kinetic energy of the aircraft and the force of the air and wind against the aircraft surfaces. The output signal of the computer is applied to the indicator position servo 33 which moves pointer 21 along scale 15 and, when the pointer 21 is moved beyond the end of a scale, operates to actuate a switch 50 which applies illuminating power to light 11.

The present position computer 32 advantageously calculates the distance moved by the aircraft since the start of the take-off procedure. For example it may be a computer for twice integrating acceleration of the aircraft. Its output signal is applied through indicator position servo 35 to move the indicator 22 up scale 15 from the starting position set in manually at dial 25 to the current position of the aircraft.

The take-off computer 31 calculates the distance from the end of the runway at which it is predicted that the aircraft can take off. Advantageously this distance is determined by calculating the current distance between the aircraft and the end of the runway and subtracting from this distance the distance that the aircraft must travel to gain take-off speed which distance may be expressed as the average velocity that the aircraft will have to have in the period remaining before take-off times the time period in which the aircraft can be accelerated to take-off velocity. Advantageously this time is calculated as the ratio of the required increase in speed and the acceleration which it is predicated the aircraft will have to undergo to reach take-off speed. The output of the computer 31 is applied through an indicator position servo 34 to the predicted take-off indicator 20. The position output of servos 33 and 34 are made to operate a limit switch 51 so that the switch is effective to cause illumination of light 12 when the take-off indicator 20 is beyond the end of the runway scale 15 and the stop indicator 21 approaches closely to the end of the runway scale.

The output of servos 34 and 35 are connected to a switch 61. When servos 34 and 35 act to move pointers 20 and 22 into horizontal alignment, switch 61 will be actuated to effect illumination of light 13 indicating that the aircraft has reached take-off speed and the pilot may initiate action to make the aircraft climb.

To accomplish the computations hereinbefore described the data collector and sensors advantageously provide signals representing aircraft acceleration, instantaneous ground speed, instantaneous true airspeed, aircraft weight, runway friction coefficient, air density, and if desirable, wind velocity. Providing for collection and actual collection of this data and the provision of means for making the indicating calculation from this data is entirely within the skill of workers in this art.

I claim:

1. A display system for an aircraft take-off monitor comprising a scale element representing a runway and points therealong and means for continuously predicting and indicating on said scale during an attempted take-off the current predicted points at which the craft may be stopped and made airborne, respectively.

2. A display system for an aircraft take-off monitor comprising a scale element representing a runway and points therealong, means for continuously predicting and indicating on said scale during an attempted take-off the current predicted points at which the craft may be stopped and made airborne, respectively, and means for continuously indicating on said scale during an attempted take-off the current position of said craft along said runway.

3. A display system for an aircraft take-off monitor comprising an elongated scale representing along its length the length of the take-off runway, three indicators movable relative to the scale, and means for positioning said indicators relative to one another and said scale in accordance with the current position of the aircraft and the current predicted positions at which the craft may be stopped or made airborne, respectively.

4. The invention defined in claim 3 in which the indicator movable in accordance with current aircraft position is movable over the center of the scale and the other indicators are movable along the edges of said scale, respectively.

5. The method of indicating whether an aircraft may safely be made airborne or stopped during an attempted take-off which comprises mechanically computing and displaying, simultaneously and continuously, the current positions at which the aircraft may be made airborne and stopped, respectively, in relation to the position of the end of said runway.

References Cited in the file of this patent

UNITED STATES PATENTS

| 2,175,129 | Rolfson | Oct. 3, 1939 |
| 2,476,315 | Morrison | July 19, 1949 |
| 2,608,948 | Forbes | Sept. 2, 1952 |
| 2,665,860 | Bancroft | Jan. 12, 1954 |
| 2,793,606 | Green et al. | May 28, 1957 |
| 2,922,982 | Hoekstra | Jan. 26, 1960 |

OTHER REFERENCES

Skyways (Snodgrass), October 1957, pp. 24, 89 to 91.
Aviation Week (Klass), June 23, 1958, pp. 65, 67, 69 to 71.
Aviation Week, July 28, 1958, pp. 77 to 79.